(12) United States Patent
Hartwich et al.

(10) Patent No.: US 8,019,961 B2
(45) Date of Patent: Sep. 13, 2011

(54) METHOD FOR STORING MESSAGES IN A MESSAGE MEMORY AND MESSAGE MEMORY

(75) Inventors: Florian Hartwich, Reutlingen (DE);
Christian Horst, Dusslingen (DE);
Franz Bailer, Reutlingen (DE)

(73) Assignee: Robert Bosch GmbH, Stuttgart (DE)

( * ) Notice: Subject to any disclaimer, the term of this patent is extended or adjusted under 35 U.S.C. 154(b) by 881 days.

(21) Appl. No.: 11/659,173

(22) PCT Filed: Jun. 29, 2005

(86) PCT No.: PCT/EP2005/053057
§ 371 (c)(1),
(2), (4) Date: Feb. 15, 2008

(87) PCT Pub. No.: WO2006/015908
PCT Pub. Date: Feb. 16, 2006

(65) Prior Publication Data
US 2008/0256320 A1    Oct. 16, 2008

(30) Foreign Application Priority Data
Aug. 5, 2004   (DE) .......................... 10 2004 038 210

(51) Int. Cl.
*G06F 12/02*      (2006.01)
(52) U.S. Cl. ........................................ 711/173; 711/171
(58) Field of Classification Search .................. 711/171, 711/173
See application file for complete search history.

(56) References Cited

U.S. PATENT DOCUMENTS

| | | | | |
|---|---|---|---|---|
| 5,548,751 A * | 8/1996 | Ryu et al. ............................. | 1/1 |
| 6,985,974 B1 * | 1/2006 | Medina ........................... | 710/52 |
| 7,269,661 B2 * | 9/2007 | Ree et al. ...................... | 709/230 |
| 7,313,648 B2 * | 12/2007 | Lloyd ........................... | 711/103 |
| 2002/0004381 A1 | 1/2002 | Theimer | |
| 2003/0210684 A1 | 11/2003 | Lai et al. | |

FOREIGN PATENT DOCUMENTS

| | | |
|---|---|---|
| CN | 1145153 | 3/1997 |
| CN | 1450767 | 10/2003 |
| JP | 2001-83951 | 3/2001 |
| WO | WO 96/20568 | 7/1996 |
| WO | WO 01/86869 | 11/2001 |

OTHER PUBLICATIONS

Patent Abstracts of Japan, Bd. 011, Nr. 113 (Apr. 9, 1987) & JP 61 262339 A (Fujitsu Ltd.), Nov. 20, 1986.
Ralf Belschner et al., FlexRay Requirements Specification, version 2.0.2, Apr. 9, 2002, 52 pages.

* cited by examiner

*Primary Examiner* — Jared I Rutz
(74) *Attorney, Agent, or Firm* — Kenyon & Kenyon LLP

(57) ABSTRACT

In a method for storing messages in a communications module, the messages to be stored contain first data having a first data volume and second data having a second data volume, and it is possible for the second data volume to be different per message. A message memory contains a header segment, in which the first data of the message are stored in a respective header area per message, and the message memory also contains a data segment, in which the second data of the message are stored in a respective data area per message The message memory is configured such that a division between the header segment and the data segment is variable, depending on the number of messages and the second data volume.

12 Claims, 11 Drawing Sheets

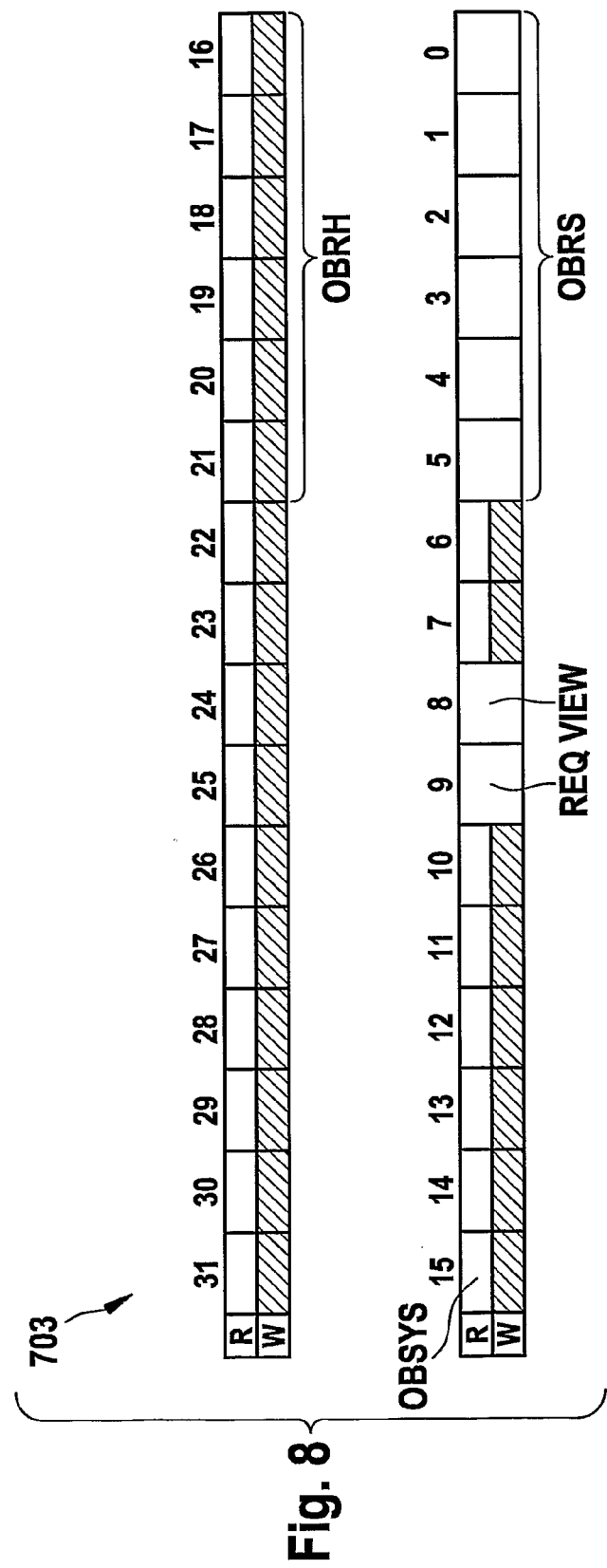

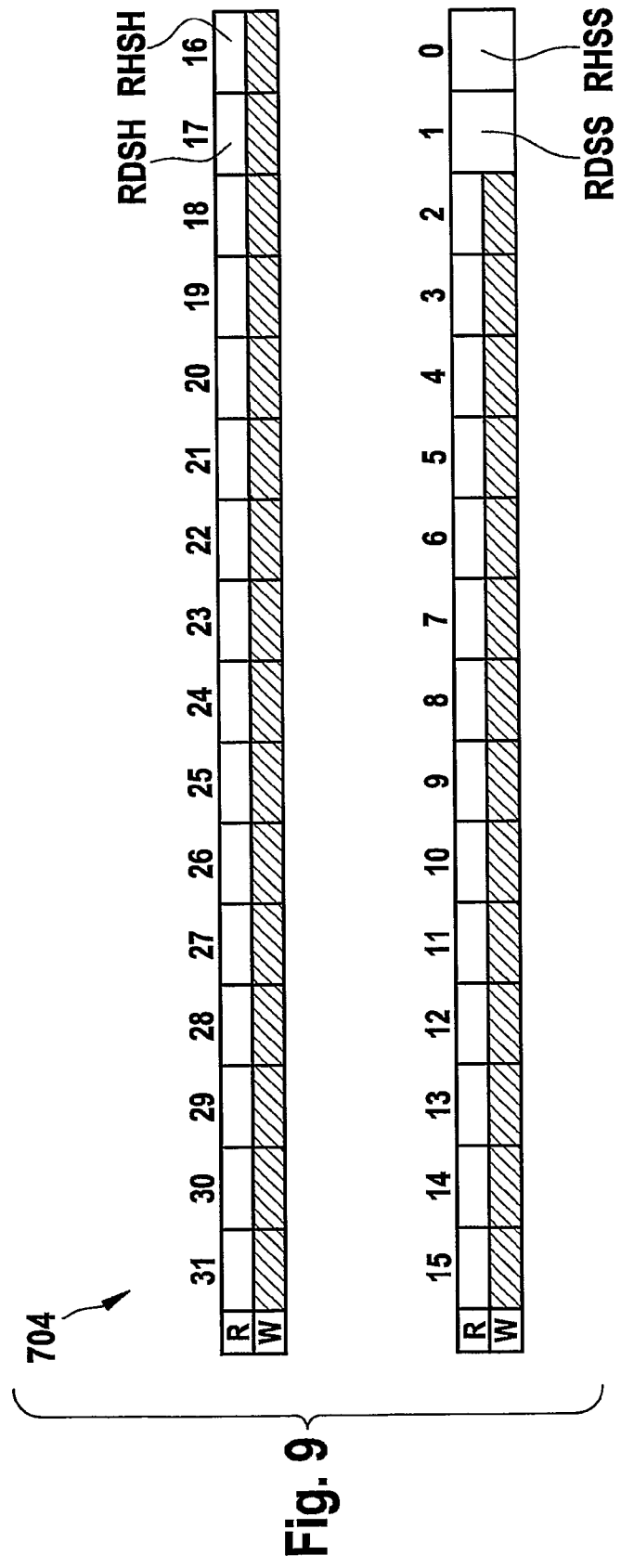

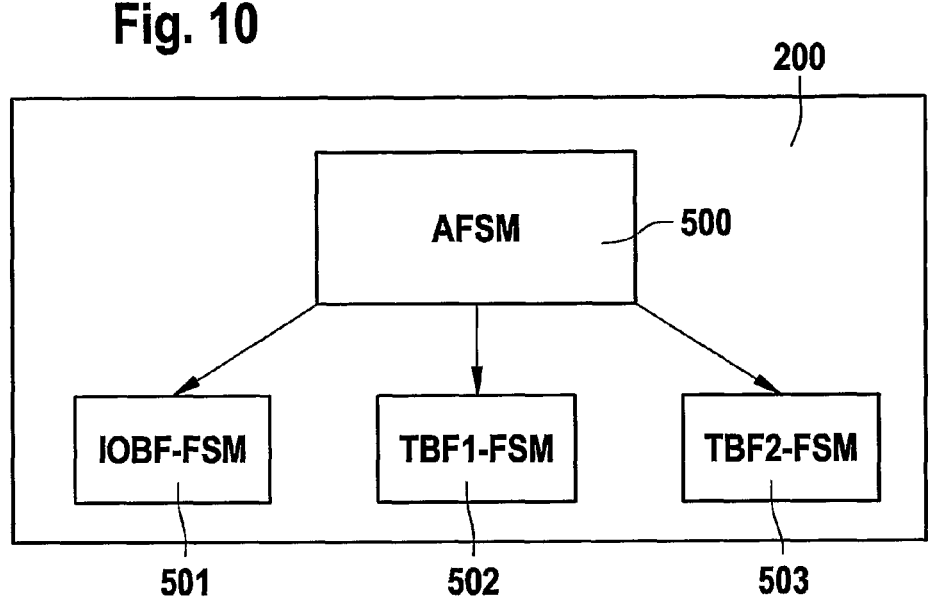
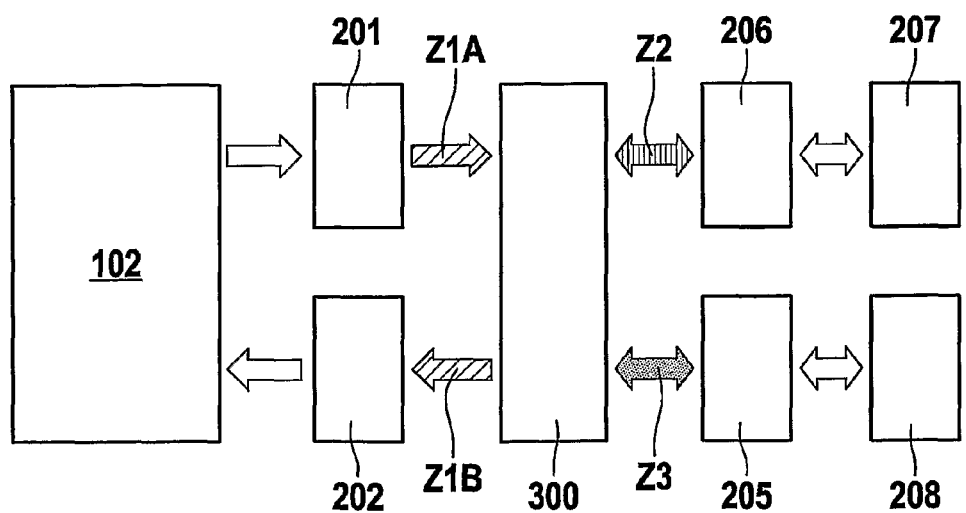

METHOD FOR STORING MESSAGES IN A MESSAGE MEMORY AND MESSAGE MEMORY

FIELD OF THE INVENTION

The invention relates to a method for storing a number of messages in a message memory in a communications module and to a communications module.

BACKGROUND INFORMATION

The networking of control units, sensors and actuators using a communications system or a bus system, that is to say, a communications link, has increased dramatically in recent years in modern motor vehicle manufacturing and in engineering, especially in the machine tool sector, that is to say, also in automation technology. By distributing functions among several control units it is possible in these cases to obtain synergetic effects. The term distributed systems is used for this. Communications between various stations is increasingly being carried out via a bus system, that is to say, a communications system. The communications traffic on the bus system, access and receiving mechanisms, and error handling are governed by a protocol. A known protocol for this is the CAN protocol or the TTCAN protocol or the FlexRay protocol, with the FlexRay protocol specification V2.0 currently being used as the basis. The FlexRay is a rapid, deterministic and error-tolerant bus system, especially for use in a motor vehicle. The FlexRay protocol operates according to the time-division-multiple-access (TDMA) method wherein the components, that is to say, users, and the messages to be transmitted are allocated fixed time slots in which they have exclusive access to the communications link. This is implemented in a comparable manner also in the case of TTCAN. The time slots are repeated in a fixed cycle, and therefore the time at which a message is transmitted over the bus may be exactly predicted and bus access takes place deterministically. To make optimum use of the bandwidth for message transmission over the bus system, FlexRay divides the cycle into a static part and a dynamic part. The fixed time slots are situated in the static part at the beginning of a bus cycle. In the dynamic part, the time slots are allocated dynamically. In the latter, exclusive bus access is made possible only for a short time (so-called minislots) in each case. Only if a bus access takes place within a minislot is the time slot lengthened by the required time. In that manner, therefore, bandwidth is used only when it is actually needed. FlexRay communicates via two physically separate lines each with a maximum data rate of 10 MB per second. The two channels correspond here to the physical layer, especially of the OSI (open system architecture) layer model. They are mainly used for redundant and therefore error-tolerant transmission of messages, but are also able to transmit different messages, which would then double the data rate. FlexRay may also be operated, however, with lower data rates.

In order to implement synchronous functions and to optimize bandwidth by using small intervals between two messages, the distributed components in the communications network, that is to say, the users, need a common time basis, the so-called global time. For clock synchronization, synchronization messages are transmitted in the static part of the cycle, with the local clock time of a component being corrected using a special algorithm conforming to the FlexRay specification, in such a way that all local clocks run synchronously with a global clock. That synchronization takes place in a comparable manner also in a TTCAN network.

A FlexRay node or FlexRay user or host contains a user processor, that is, the host processor, a FlexRay controller or communications controller and, in the case of bus monitoring, a bus guardian. The host processor, that is, the user processor, supplies and processes the data transmitted via the FlexRay communications controller. For communication in a FlexRay network, messages, or message objects, may be configured with, for example, up to 254 data bytes. In order to transmit those messages, or message objects, between the physical layer, that is, the communications link, and the host processor, a communications module, e.g., a communications controller, is used.

An object of the present invention is to provide a message memory for a communications module of a bus system, which message memory supports the transmission of messages in an optimum manner.

SUMMARY

The present invention provides a method for storing messages in such a message memory and a corresponding message memory, for storing messages to be transmitted and received messages using especially a RAM (random access memory). The number of storable messages is dependent on the size of the data areas of the messages. The present invention allows a variable number of messages to be stored in a memory, e.g., a RAM, of predefined size, and at the same time allows the size of the RAM memory required to be minimized and optimally utilized without the size of the data areas of the messages being restricted.

For that purpose, a method for storing messages and a message memory in a communications module for storing a number of messages are described, wherein the messages to be stored contain first data having a first data volume, so-called header data (that is, status and configuration data) and second data having a second data volume (the data that are actually to be sent). The second data volume may, as mentioned, be different per message, wherein the message memory advantageously contains a header segment, in which the first data of the message are stored in a respective header area per message, and the message memory further contains a data segment, in which the second data of the message are stored in a respective data area per message, and the message memory is so configured that a variable division is made between the header segment and the data segment, depending on the number of messages and the second data volume. In that manner, the division of the RAM memory especially, that is to say, of the message memory, between header section or header segment and data section, that is, data segment, is variable, with the result that, when fewer messages are configured, the header section is smaller and, in returns the area that becomes free in the message memory may be used for the storage of the data that are actually to be transmitted.

In one advantageous example embodiment, for that purpose a pointer element, a so-called data pointer, is provided per message in the header segment in each header area, which data pointer specifies a data area in the data segment by pointing, in particular, to the start address of the respective data area.

In another example embodiment, the first and second data of the messages are stored in the message memory in a predefinable order, so that the order of the header areas in the header segment and the order of the data areas in the data segment is in each case identical and thus the position of the respective header area of a message in the header segment gives the associated data area in the data segment. The message memory is advantageously in the form of a FIFO here in order for the message to be further transmitted in the order in which it arrived.

To make optimum use of the storage space in the message memory, the first data of the message are stored in a respective header area per message and using a first number of memory words that is fixed and identically predefined for each header area, especially in exactly one memory word. The corresponding data pointer may also be stored at the same time in a predefined, fixed number of memory words, with the result that altogether the same number of memory words is obtained for each header area of the header segment and thus, owing to the use of a constant number of memory words, the size of the header segment is altogether formed solely by the number of messages stored or to be stored.

For that purpose, the message memory is advantageously configured with a predefined fixed memory word length. In particular, it is advantageous for the header area and the data area to follow each other directly and for the variable division to be produced by shifting that area boundary.

For error recognition, it may advantageously be provided that each data area includes at least one predefined memory word length and that, per memory word length, a control identifier is provided in the data area, e.g., a parity bit, and that the message memory is associated with a parity bit generator element and a parity bit checking element in order to generate the control identifier, e.g., the parity bit, and thereby check the correctness of the stored data.

In an example embodiment, a message memory according to the present invention is used in a FlexRay communications module that is in turn disposed in or directly associated with a user of a FlexRay network, that is to say, a control unit.

According to the present invention, therefore, the variable division of the message memory provides diverse advantages: the operator is able to decide, when programming, whether he wishes to use a larger number of messages with a small data field or a smaller number of messages with a large data field. When messages are configured with a data area of varying size, the available memory is optimally utilized. The operator has the possibility of using a data area for different messages in combination. When the communications controller, or the communications module, is implemented on an integrated circuit, the size of the message memory may be exactly matched to the requirements of the application by adapting the memory depth of the memory used, especially the RAM memory, without the other functions of the communications controller or communications module being altered.

BRIEF DESCRIPTION OF THE DRAWINGS

FIGS. 7 to 9 schematically illustrate the architecture and the process of data access in the direction from message memory to user.

FIG. 10 shows schematically the message handler and the finite state machines present therein.

FIG. 11 shows schematically the components of the communications module, and the user and the corresponding data paths which are controlled by the message handler.

DETAILED DESCRIPTION

Figure 1:
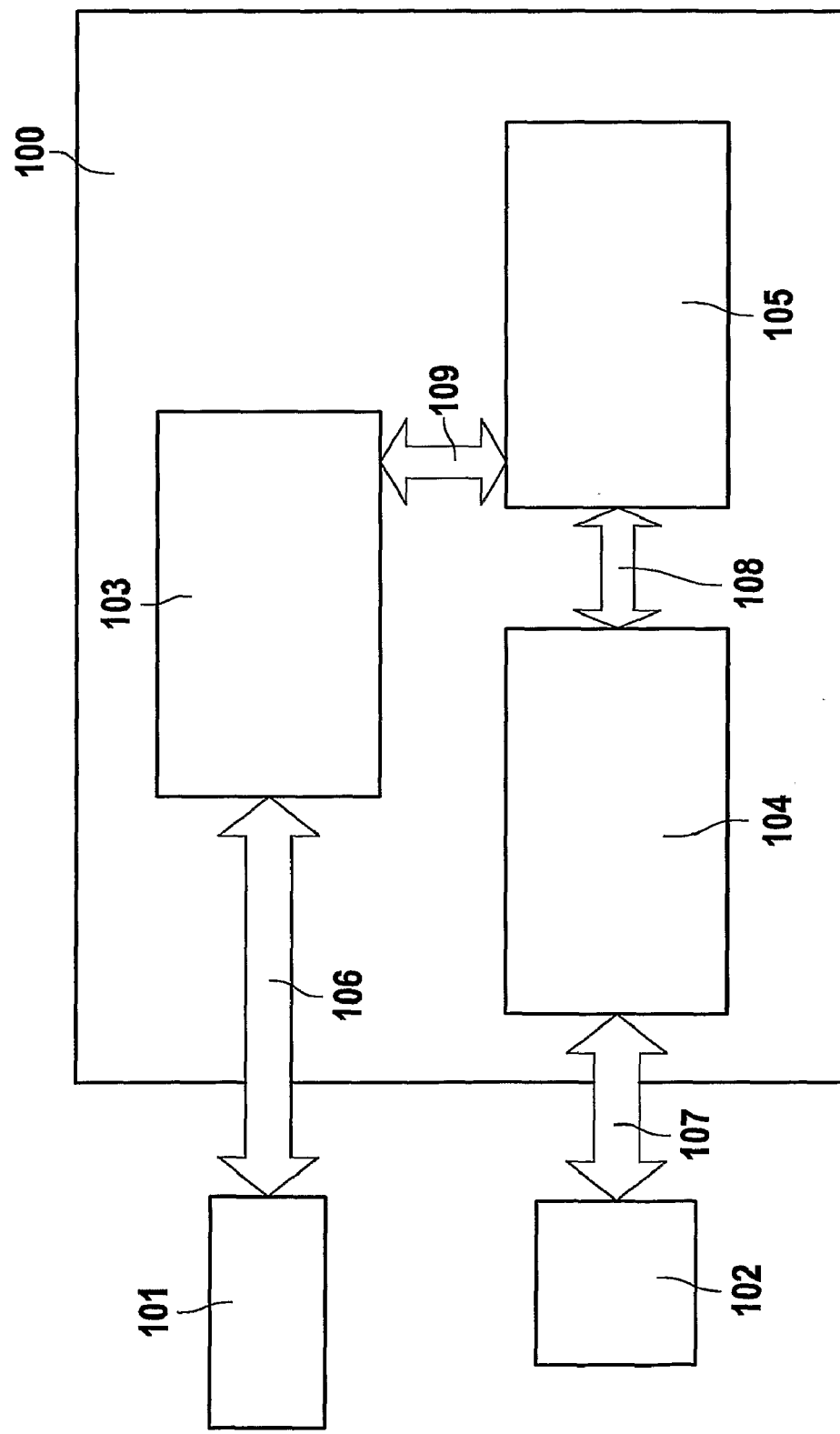
FIG. 1 is a schematic illustration of the communications module and its connection to the physical layer, i.e., the communications link and the communications or host user.

FIG. 1 shows schematically a FlexRay communications module 100 for connection of a user or host 102 to a FlexRay communications link 101, i.e., the physical layer of the FlexRay. For that purpose, the FlexRay communications module 100 is connected via a connection 107 to the user or user processor 102 and via a connection 106 to the communications link 101. For trouble-free connection as regards transfer times on the one hand and as regards data integrity on the other, a distinction is made schematically between essentially three arrangements in the FlexRay communications module. A first arrangement 105 is used for storage, especially temporary storage, of at least part of the messages that are to be transmitted. Between the user 102 and that first arrangement 105, a second arrangement 104 is connected via connections 107 and 108. A third arrangement 103 is also connected between user 101 and first arrangement 105 via connections 106 and 109, which makes it possible to achieve very flexible inputting and outputting of data as part of messages, especially FlexRay messages, into and from first arrangement 105 while guaranteeing data integrity with optimum speed.

Figure 2:
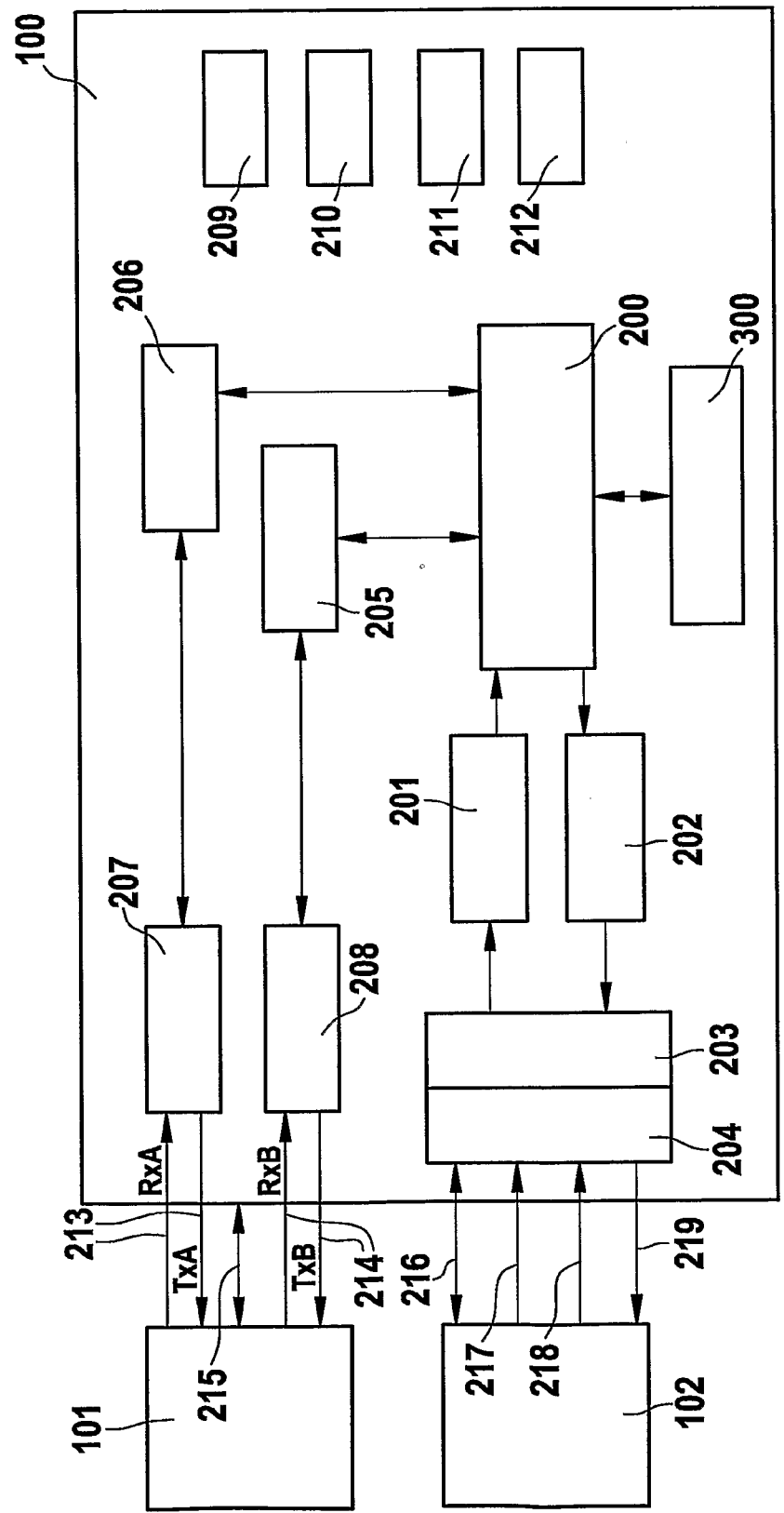
FIG. 2 shows an example embodiment of the communications module and its connection in more detail.

In FIG. 2, that communications module 100 is shown once more and in more detail in an example embodiment. Also shown in more detail are the respective connections 106 to 109. Second arrangement 104 contains here an incoming buffer or input buffer (IBF) 201, an outgoing buffer or output buffer (OBF) 202 and an interface module made up of two parts 203 and 204, the one part-module 203 being user-independent and the second part-module 204 being user-specific. User-specific part-module 204 (customer CPU interface CIF) connects a user-specific host CPU 102, that is, a customer-specific user, to the FlexRay communications module. For that purpose, a bidirectional data line 216, an address line 217 and a control input 218 are provided. Also provided, with 219, is an interrupt output. The user-specific part-module 204 is connected to a user-independent part-module 203 (generic CPU interface, GIF), i.e., the FlexRay communications module or the FlexRay IP module has a generic, or general, CPU interface to which a large number of different customer-specific host CPUs may be connected via corresponding user-specific part-modules, that is, customer CPU interfaces CIF. As a result, only part-module 204 needs to be varied depending on the user, which means significantly lower expenditure.

Input buffer or incoming buffer 201 and outgoing buffer or output buffer 202 may be formed in one memory module or alternatively in separate memory modules. Input buffer 201 is used for temporary storage of messages for transmission to message memory 300. The input buffer module is preferably so configured that it is able to store two complete messages each composed of a header segment, especially with configuration data, and a data segment or payload segment. The input buffer is in two parts (part-buffer and shadow memory), which makes it possible to speed up the transmission between user CPU 102 and message memory 300 by writing to the two parts of the input buffer alternately, in other words by access alternation. Similarly, the output buffer or outgoing buffer (OBF) is used for the temporary storage of messages for transmission from message memory 300 to user CPU 102. Output buffer 202 is also in a form such that two complete messages composed of header segment, especially with configuration data, and data segment, that is, payload segment, may be stored. Here too, output buffer 202 is divided into two parts, a part-buffer and a shadow memory, which makes it possible in this case also to speed up transmission between user or host CPU 102 and message memory 300 by reading from the two parts alternately, in other words by access alternation. That second arrangement 104, composed of blocks 201 to 204, is connected to first arrangement 105 as illustrated.

Arrangement 105 is composed of a message handler (MHD) 200 and a message memory (message RAM) 300. The message handler monitors and controls the data transfer between input buffer 201 and output buffer 202 and message memory 300. It similarly monitors and controls data transmission in the other direction via third arrangement 103. The message memory may be in the form of single-ported RAM. That RAM memory stores the messages or message objects, that is to say, the actual data, together with configuration and status data. The exact structure of message memory 300 is shown in detail in FIG. 3.

Third arrangement 103 is composed of blocks 205 to 208. In conformity with the two channels of the FlexRay physical layer, that arrangement 103 is divided into two data paths each having two data directions. This is made clear by connections 213 and 214, in which the two data directions for channel A, R×A and T×A, for receiving (R×A) and sending (T×A) and, for channel B, R×B and T×B are shown. Connection 215 denotes an optional bidirectional control input. Third arrangement 103 is connected via a first buffer 205 for channel B and a second buffer 206 for channel A. Those two buffers (transient buffer RAMs: RAM A and RAM B) serve as temporary memories for the data transmission from and to first arrangement 105. In conformity with the two channels, those two buffers 205 and 206 are each connected to a respective interface module 207 and 208 containing the FlexRay protocol controller or bus protocol controller composed of a send/receive shift register and the FlexRay protocol finite state machine. The two buffers 205 and 206 thus serve as temporary memories for the data transmission between the shift registers of the interface modules or FlexRay protocol controllers 207 and 208 and message memory 300. In this case also, the data fields, or the payload segment or data segment, of two FlexRay messages are advantageously stored by each buffer 205 or 206.

There is also shown in communications module 100 by reference numeral 209 the global time unit (GTU) which is responsible for producing the global time pattern in the FlexRay, that is to say the microtick μT and the macrotick MT. The error-tolerant clock synchronization of the cycle counters and the monitoring of the time flows in the static and dynamic segment of the FlexRay is also regulated by global time unit 209.

Block 210 represents the system universal control (SUC) by which the operation modes of the FlexRay communications controller are monitored and controlled. Those modes include wakeup, startup, reintegration or integration, normal operation and passive operation.

Block 211 shows the network and error management (NEM) as described in the FlexRay protocol specification v2.0. Finally, block 212 shows the interrupt control (INT) which manages the status and error interrupt flags and monitors and controls interrupt outputs 219 to user CPU 102. Block 212 contains, in addition, an absolute and a relative timer for generating timer interrupts.

For communication in a FlexRay network, message objects or messages (message buffer) may be configured with up to 254 data bytes. Message memory 300 is especially a message RAM capable of storing, for example, up to a maximum of 64 message objects. All functions concerned with the handling or management of the messages themselves are implemented in message handler 200. Those functions are, for example, acceptance filtering, transfer of messages between the two FlexRay protocol controller blocks 207 and 208 and message memory 300, that is, the message RAM, and monitoring of the transmission sequence, and the providing of configuration data and status data.

An external CPU, that is to say, an external processor of user processor 102, may access the registers of the FlexRay communications module directly via the user interface, using user-specific part 204. A large number of registers is used in that operation. Those registers are used to configure and control the FlexRay protocol controllers, that is, interface modules 207 and 208, message handler (MHD) 200, global time unit (GTU) 209, system universal controller (SUC) 210, network and error management unit (NEM) 211, interrupt controller (INT) 212 and access to the message RAM, that is, to message memory 300, and also to display the corresponding status. At least parts of those registers will be discussed in more detail with reference to FIGS. 4 to 6 and 7 to 9. A FlexRay communications module according to the present invention of the kind described enables simple implementation of the FlexRay Specification v2.0 whereby it is possible to generate simply an ASIC or a microcontroller having corresponding FlexRay functionality.

Figure 3:
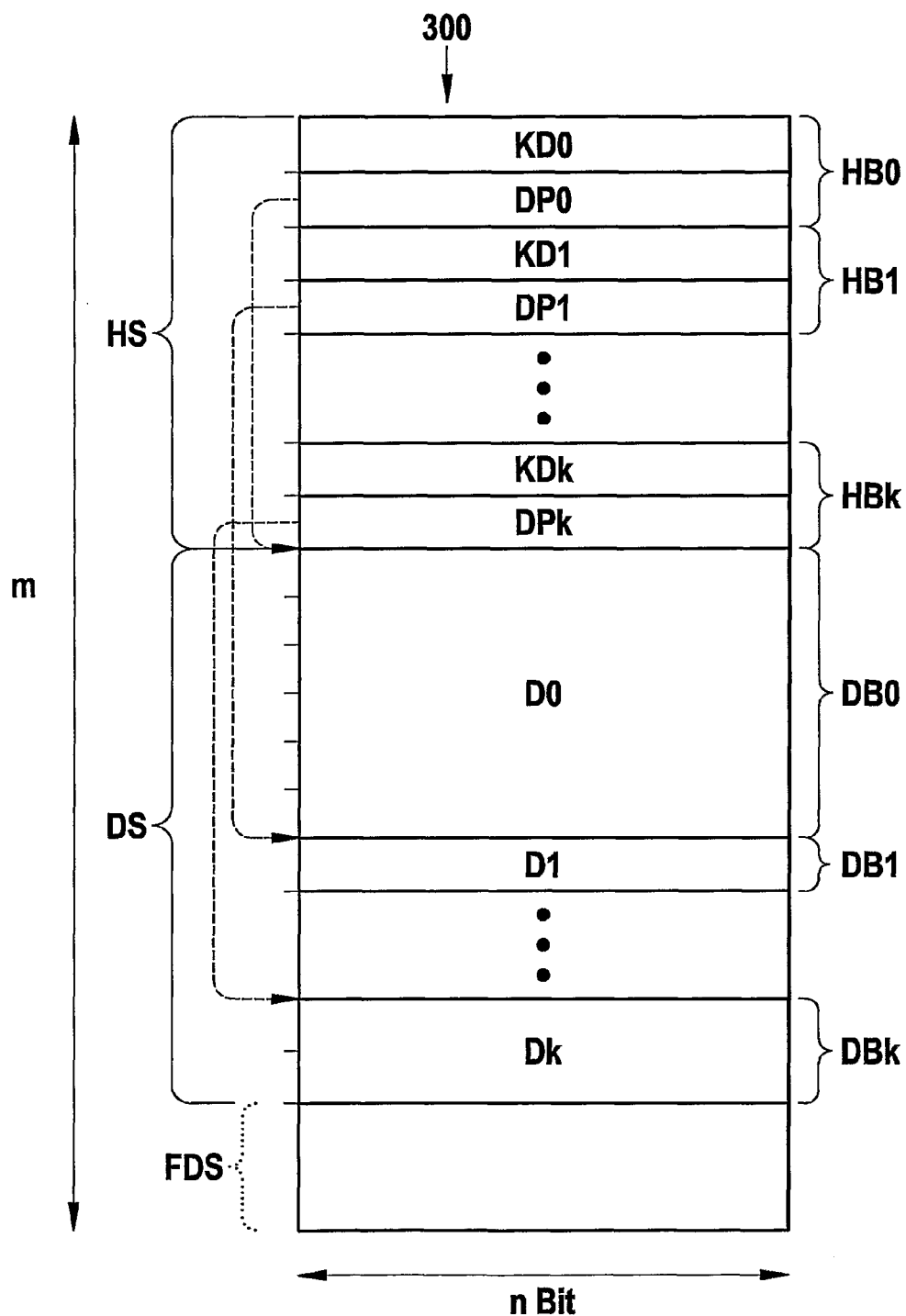
FIG. 3 shows the structure of the message memory.

FIG. 3 describes the division of message memory 300 in detail. For the functionality of a FlexRay communications controller that is required according to the FlexRay protocol specification, a message memory for providing messages that are to be sent (transmit buffer) and for storing messages that have been received without error (receive buffer) is required. A FlexRay protocol permits messages having a data area, or a payload area, of from 0 to 254 bytes. As shown in FIG. 2, the message memory is part of FlexRay communications module 100. The method described hereinafter and the corresponding message memory describe the storage of messages to be sent and of messages received, especially using a random access memory (RAM), it being possible using the mechanism according to the present invention to store a variable number of messages in a message memory of a predefined size. The number of storable messages is dependent on the size of the data areas of the individual messages, whereby, on the one hand, the size of the memory required may be minimized without the size of the data areas of the messages being restricted and, on the other hand, the memory is optimally utilized. That variable division of a message memory, e.g., a RAM-based message memory, for a FlexRay communications controller will be described in detail below.

For implementation, by way of example a message memory having a fixed word length of n bits, for example 8, 16, 32 etc., and a predefined storage depth of m words is defined (m, n being natural numbers). Message memory 300 is divided into two segments, a header segment HS and a data segment DS (payload section, payload segment). Accordingly, per message, a header area HB and a data area DB are set up. For messages 0, 1 to k (k being a natural number), therefore, header areas HB0, HB1 to HBk and data areas DB0, DB1 to DBk are set up. In a message, a distinction is made, therefore, between first and second data, the first data corresponding to configuration data and/or status data regarding the FlexRay message and being filed in each case in a header area HB (HB0, HB1, . . . ,HBk). The second data, which correspond to the actual data that are to be transmitted, are correspondingly filed in data areas DB (DB0, DB1, . . . , DBk). There is thus obtained for the first data, per message, a first data volume (measured in bits, bytes or memory words) and, for the second data of a message, a second data volume (likewise measured in bits, bytes or memory words), it being possible for the second data volume to be different per message. The division between header segment HS and data segment DS is variable in message memory 300, that is to say, there is no predefined boundary between the areas. According to the present invention, the division between header segment HS and data segment DS is dependent on the number k of messages and on the second data volume, that is, the volume of the actual data, of a message or of all k messages together. According to the present invention, the configuration data KD0, KD1 to KDk of any given message are directly assigned a respective pointer element or data pointer DP0, DP1 to DPk. In an example embodiment, each header area HB0, HB1 to HBk is assigned a fixed number of memory words, two in this case, so that one configuration datum KD (KD0, KD1, . . . , KDk) and one data pointer DP (DP0, DP1, . . . , DPk) are always filed together in one header area HB. That header segment HS with the header areas HB, the size or first data volume of which is dependent on the number k of messages to be stored, is followed by the data segment DS for storing the actual message data D0, D1 to Dk. That data segment (or data section) DS depends, in its data volume, on the respective data volume of the filed message data, in this case, for example, six words in DB0, one word in DB1 and two words in DBk. The respective data pointers DP0, DP1 to DPk thus always point to the beginning, that is, to the start address, of the respective data area DB0, DB1 to DBk in which the data D0, D1 to Dk of the respective messages 0, 1 to k are filed. Thus, the division of the message memory between header segment HS and data segment DS is variable and depends on the number of messages themselves and on the respective data volume of a message and hence on the overall second data volume. If fewer messages are configured, the header segment becomes smaller and the area that becomes free in the message memory may be used as an adjunct to the data segment DS for the storage of data. That variability makes it possible to ensure optimum memory utilization, thereby also making the use of smaller memories possible. The free data segment FDS, especially the size thereof, which is similarly dependent on the combination of the number k of messages stored and the respective second data volume of the messages, is thus minimal and may even become zero.

Apart from the use of data pointers, it is also possible for the first and second data, that is, the configuration data KD (KD0, KD1, . . . , KDk) and the actual data D (D0, D1, . . . , Dk) to be filed in a predefinable order, so that the order of the header areas HB0 to HBk in the header segment HS and the order of the data areas DB0 to DBk in the data segment DS are identical in each case. It would then even be possible perhaps to dispense with a data pointer.

In an example embodiment, the message memory is assigned an error detection generator, especially a parity bit generator element and an error detection checker, especially a parity bit checking element, in order to ensure the correctness of the stored data in HS and DS by making it possible to store, per memory word or per area (HB and/or DB), a check sum, especially a check sum also in the form of a parity bit. Other control identifiers, for example a CRC (cyclic redundancy check) or more powerful identifiers such as ECC (error code correction) are possible. In comparison with a fixed division of the message memory, therefore, the following advantages are obtained:

The operator is able to decide, when programming, whether he wishes to use a larger number of messages with a small data field or whether he wishes to use a smaller number of messages with a large data field. When messages are configured with a data area of varying size, the available storage space is optimally utilized. The operator has the possibility of using a data storage area for different messages in combination.

When the communications controller is implemented on an integrated circuit, the size of the message memory may be matched to the requirements of the application by adapting the storage depth of the memory used, without the other functions of the communications controller being altered.

Turning now to FIGS. 4 to 6 and 7 to 9, host CPU access, that is, writing and reading of configuration data and/or status data and of the actual data, via buffer arrangement 201 and 202, will be described in detail below. The aim here is to achieve a dissociation in the data transmission in such a way that the integrity of the data may be ensured and, at the same, a high transfer rate is guaranteed. Those operations are controlled by message handler 200, as will be described in more detail later with reference to FIGS. 10, 11 and 12.

Figure 4:
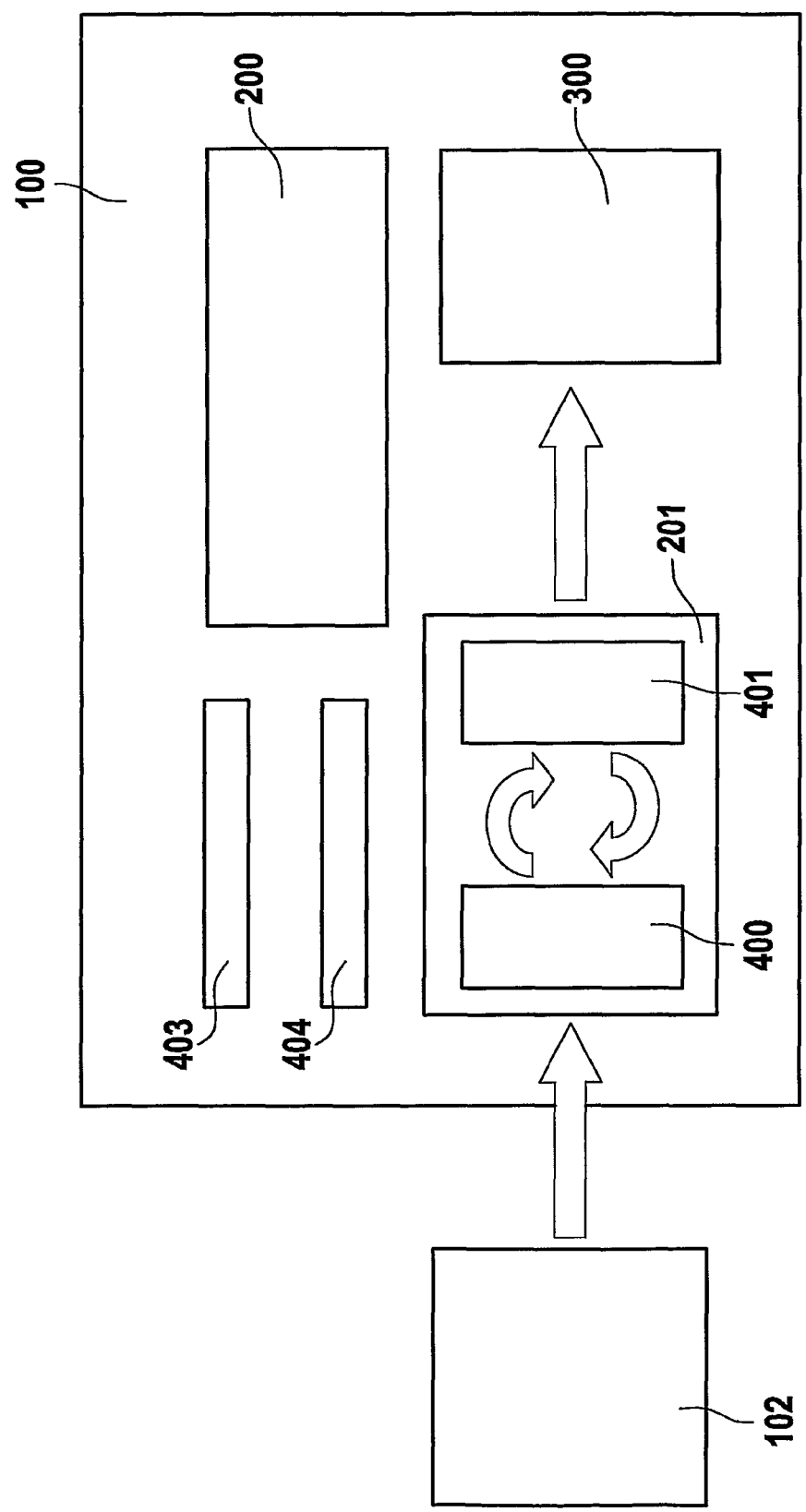
FIGS. 4 to 6 schematically illustrate the architecture and the process of data access in the direction from user to message memory.
Figure 5:
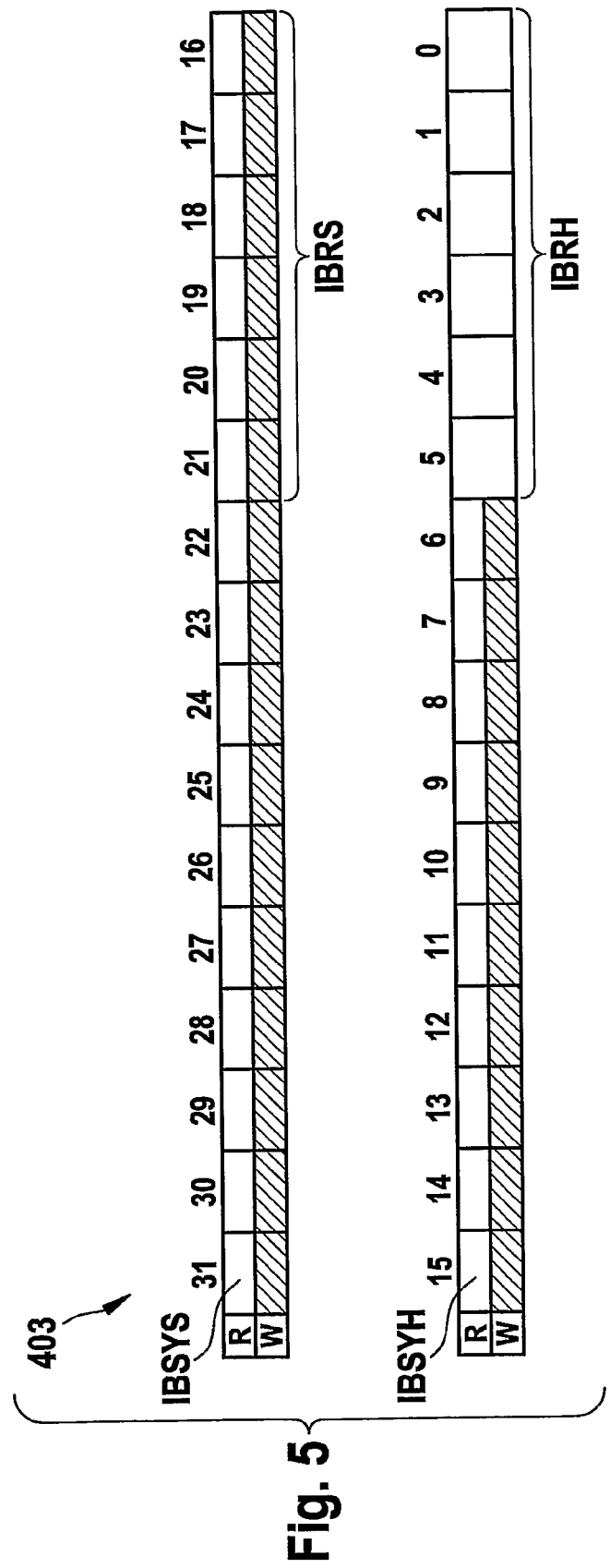
Figure 6:
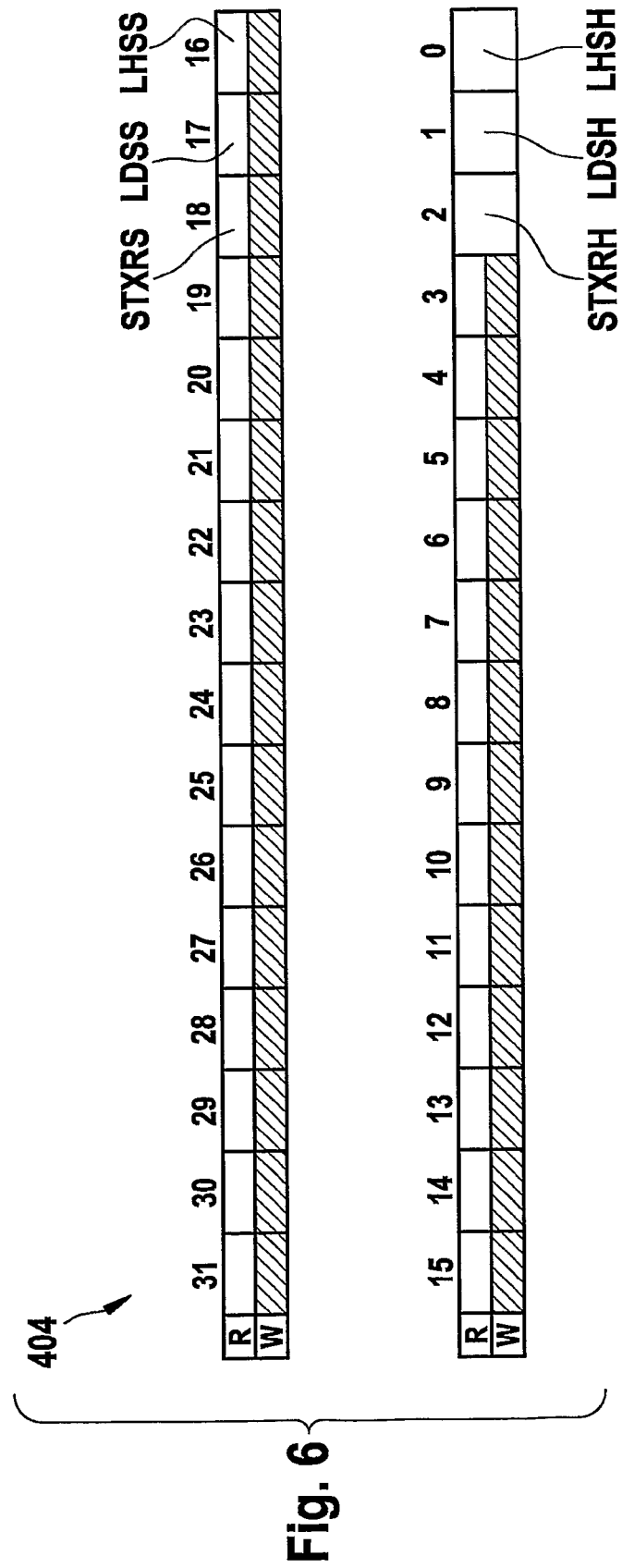

In FIGS. 4, 5 and 6, first the write accesses to message memory 300 by the host CPU or user CPU 102 via input buffer 201 are described in detail. For that purpose, FIG. 4 shows once again communications module 100, with only the parts of communications module 100 that are relevant here being shown for the sake of clarity. The latter is formed firstly by message handler 200, which is responsible for controlling the sequences of operations, and by two control registers 403 and 404 which may be accommodated outside message handler 200 in communications module 100, as illustrated, but may also be in message handler 200 itself. 403 represents the input buffer command request register and 404 the input buffer command mask register. Write accesses by host CPU 102 to message memory 300 (message RAM) take place, therefore, via an input buffer 201 disposed between them. That input buffer 201 is divided or doubled, more specifically in the form of a part-buffer 400 and a shadow buffer 401 associated with the part-buffer. It is thus possible, as described below, for continuous access by host CPU 102 to the messages, or message objects, and data, of message memory 300 to take place and thus for data integrity and accelerated transmission to be guaranteed. Control of the accesses is carried out by input buffer command request register 403 and by input buffer command mask register 404. In register 403, the numbers 0 to 31 represent the respective bit positions in 403, by way of example here for a length of 32 bits. The same applies to register 404 and bit positions 0 to 31 in 404.

According to the present invention, bit positions 0 to 5, 15, 16 to 21 and 31, for example, of register 403 are given a special function with regard to control of the process flow. Thus, an identifier IBRH (input buffer request host) may be entered as a message identifier in bit positions 0 to 5 of register 403. An identifier IBRS (input buffer request shadow) may similarly be entered in bit positions 16 to 21 of register 403. Similarly, IBSYH is entered in register position 15 of 403 as an access identifier and IBSYS is entered in register position 31 of 403 as an access identifier. Positions 0 to 2 of register 404 are also labeled, LHSH (load header section host) and LDSH (load data section host) being entered in 0 and 1 as further identifiers forming data identifiers. Those data identifiers are in the simplest form here, that is to say, each is in the form of one bit. With STXRH (set transmission X request host), a start identifier is written into bit position 2 of register 404.

The course of the write access to the message memory via the input buffer will now be described below.

Host CPU 102 writes to input buffer 201 the data of the message that is to be transferred. In that operation, host CPU 102 may write only the configuration and header data KD of a message for the header segment HS of the message memory or only the actual data D of a message that are to be transmitted for the data segment DS of the message memory, or both. Which part of a message, that is, configuration data and/or the actual data, is to be transmitted is specified by the specific data identifiers LHSH and LDSH in input buffer command mask register 404. LHSH (load header section host) specifies whether the header data, that is, the configuration data KD, are transmitted and LDSH (load data section host) specifies whether the data D are to be transmitted. By virtue of the fact that input buffer 201 is in two parts, with a part of the buffer 400 and an associated shadow buffer 401, and reciprocal access is to take place, there are provided as counterparts to LHSH and LDSH two further data identification areas, which are related to shadow buffer 401. Those data identifiers in bit positions 16 and 17 of register 404 are denoted by LHSS (load header section shadow) and LDSS (load data section shadow). These thus control the transmission operation with regard to shadow buffer 401.

If, then, the start bit or start identifier STXRH (set transmission X request host) in bit position 2 of input buffer command mask register 404 is set, once the respective configuration data and/or actual data that are to be transmitted have been transferred to message memory 300 a transmission request for the corresponding message object is automatically set. That is to say, that start identifier STXRH controls, and especially starts, the automatic transmission of a message object that is to be transmitted.

The counterpart corresponding to this for the shadow buffer is the start identifier STXRS (set transmission X request shadow), which is present, for example, in bit position 18 of input buffer command mask register 404 and which here also is in the simplest case in the form of one bit. The function of STXRS is analogous to the function of STXRH, but merely related to shadow buffer 401.

When host CPU 102 writes the message identifier, especially the number of the message object in message memory 300 into which the data of input buffer 201 are to be transferred, into bit positions 0 to 5 of input buffer command request register 403, that is to say, after IBRH, part-buffer 400 of input buffer 201 and associated shadow buffer 401 are exchanged, in other words the respective access by host CPU 102 and message memory 300 to the two part-buffers 400 and 401 is exchanged, as indicated by the semi-circular arrows. In the process, the data transfer, i.e., the data transmission, for example, to message memory 300 is also started. The data transmission to message memory 300 itself takes place from shadow buffer 401. At the same time, the register areas IBRH and IBRS are exchanged. Likewise, LHSH and LDSH are exchanged for LHSS and LDSS. Similarly, STXRH is exchanged with STXRS. IBRS thus shows the identifier of the message, that is, the number of the message object for which a transmission, or a transfer, from shadow buffer 401 is in progress, or which message object, that is, which area in the message memory, last received data (KD and/or D) from shadow memory 401. The identifier (again 1 bit, for example, in this case) IBSYS (input buffer busy shadow) in bit position 31 of input buffer command request register 403 indicates whether a transmission involving shadow buffer 401 is currently taking place. Thus, for example, at IBSYS=1, transmission is taking place from shadow buffer 401 and, at IBSYS=0, is not taking place. That bit IBSYS is set, for example, by writing IBRH, that is, bit positions 0 to 5, in register 403 in order to indicate that a transfer between shadow buffer 401 and message memory 300 is in progress. When that data transmission to message memory 300 has been completed, IBSYS is re-set again.

While the data transfer from shadow buffer 401 is taking place, host CPU 102 is able to write to the input buffer, or to part-buffer 400, the next message that is to be transferred. By using a further access identifier IBSYH (input buffer busy host), for example, in bit position 15 of register 403, the identifier may be still further refined. If host CPU 102 is currently writing IBRH, that is, bit positions 0 to 5 of register 403, while a transmission is taking place between shadow buffer 401 and message memory 300, that is to say, IBSYS=1, IBSYH is set in input buffer command request register 403. As soon as the transfer, or transmission, currently taking place has been completed, the requested transfer (request by STXRH, see above) is started and bit IBSYH is re-set. Bit IBSYS remains set for the whole time in order to indicate that data are being transferred to the message memory. All of the bits used in all of the exemplary embodiments may also be in the form of identifiers having more than one bit. The one-bit solution is advantageous for economy of storage and processing.

The mechanism described above allows host CPU 102 to transfer data continuously into the message objects present in the message memory and formed by header area HB and data area DB, provided that the access speed of host CPU 102 to the input buffer is less than or equal to the internal data transfer rate of the FlexRay IP module, that is to say, of communications module 100.

Figure 7:
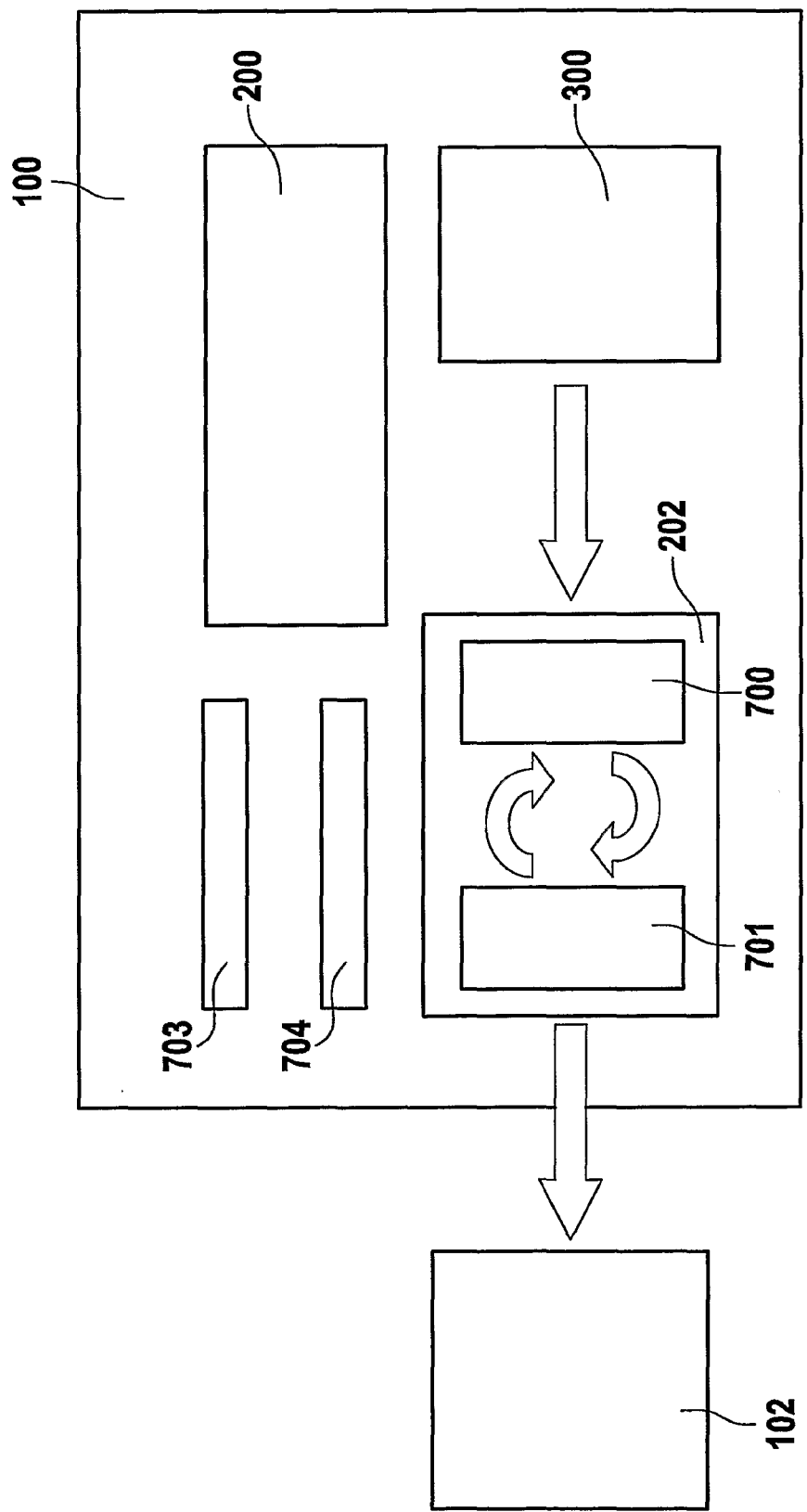

In FIGS. 7, 8 and 9, the read accesses to message memory 300 by the host CPU or user CPU 102 via the outgoing buffer or output buffer 202 are described in detail. For that purpose, FIG. 7 shows once more communications module 100, with only the relevant parts of communications module 100 being shown also in this case for reasons of clarity. The latter is formed firstly by message handler 200, which is responsible for controlling the sequences of operations, and by two control registers 703 and 704 which may be accommodated outside message handler 300 in communications module 100, as illustrated, but may also be in message handler 200 itself. 703 represents the output buffer command request register and 704 the output buffer command mask register. Read accesses by host CPU 102 to message memory 300 take place, therefore, via output buffer 202 which is disposed between them. That output buffer 202 also is divided or doubled, more specifically forming a part-buffer 701 and a shadow buffer 700 associated with the part-buffer. Here too, therefore, it is thus possible, as described below, for continuous access by host CPU 102 to messages, or message objects, and data, of message memory 300 to take place and thus for data integrity and accelerated transmission to be guaranteed in the opposite direction from the message memory to the host. Control of the accesses is carried out by output buffer command request register 703 and by output buffer command mask register 704. In register 703 also, the numbers 0 to 31 represent the respective bit positions in 703, by way of example here for a length of 32 bits. The same applies to register 704 and bit positions 0 to 31 in 704.

According to the present invention, bit positions 0 to 5, 8 and 9, 15 and 16 to 21, for example, of register 703 are given a special function with regard to control of the sequence of the read access. Thus, an identifier OBRS (output buffer request shadow) may be entered as a message identifier in bit positions 0 to 5 of register 703. An identifier OBRH (output buffer request host) may similarly be entered in bit positions 16 to 21 of register 703. An identifier OBSYS (output buffer busy shadow) may be entered as an access identifier in bit position 15 of register 703. Positions 0 and 1 of output buffer command mask register 704 are also labeled, RDSS (read data section shadow) and RHSS (read head section shadow) being entered in 0 and 1 as further identifiers forming data identifiers. Further data identifiers are provided, for example, in bit positions 16 and 17 by RDSH (read data section host) and RHSH (read header section host). Here too, those data identifiers are by way of example in the simplest form, that is to say, each is in the form of one bit. In bit position 9 of register 703, a start identifier REQ is entered. A switch-over identifier VIEW is also provided, which is entered, for example, in bit position 8 of register 703.

Host CPU 102 requests the data of a message object from message memory 300 by writing the identifier of the desired message, that is to say, especially the number of the desired message object, after OBRS, that is, in bit positions 0 to 5 of register 703. In this case also, just as in the opposite direction, the host CPU may read only the status and/or configuration and header data KD of a message, that is, from a header area, or only the data D of a message that are actually to be transmitted, that is, from the data area, or may read both. Which part of the data is to be transmitted, that is, from the header area and/or the data area, is specified in this case, in a manner comparable to the opposite direction, by RHSS and RDSS. That is to say, RHSS indicates whether the header data are to be read and RDSS indicates whether the actual data are to be read.

A start identifier serves to start the transmission from the message memory to shadow buffer 700. That is to say, if, as in the simplest case, one bit is used as the identifier, by setting bit REQ in bit position 9 in output buffer command request register 703 the transmission from message memory 300 to shadow buffer 700 is started. The current transmission is again indicated by an access identifier, here once again in the simplest case by a bit OBSYS in register 703. To avoid collisions, it is advantageous if bit REQ may be set only when OBSYS is not set, in other words when no transmission is currently taking place. In this case also, message transfer then takes place between message memory 300 and shadow buffer 700. It would be possible for the actual process to take place and be controlled, on the one hand, in a manner comparable to the opposite direction as described in FIGS. 4, 5 and 6 (complementary register assignment) or, alternatively, in a variation, by an additional identifier, namely a switch-over identifier VIEW in bit position 8 of register 703. That is to say, when the transmission has been completed, bit OBSYS is re-set and, by setting bit VIEW in output buffer command request register 703, part-buffer 701 and associated shadow buffer 700 are exchanged, or in other words the accesses thereto are exchanged, and host CPU 102 is then able to read the message object requested from the message memory, that is, the corresponding message, from part-buffer 701. Here too, in a manner comparable to the opposite direction of transmission in FIGS. 4 to 6, register cells OBRS and OBRH are exchanged. Similarly, RHSS and RDSS are exchanged for RHSH and RDSH. As a protection mechanism, it is possible also in this case to provide that bit VIEW may be set only when OBSYS is not set, in other words when no transmission is currently taking place.

Read accesses by host CPU 102 to message memory 300 thus take place via an output buffer 202 disposed between them. Like the input buffer, that output buffer is doubled or in two parts in order to guarantee continuous access by host CPU 102 to the message objects that are stored in message memory 300. The advantages of high data integrity and accelerated transmission are obtained in this case also.

The use of the described input and output buffers ensures that a host CPU is able to access the message memory without interruption despite the internal latency of the module.

To ensure this data integrity, the transmission of the data, especially the forwarding in communications module 100, is performed by message handler (MHD) 200. For that purpose, message handler 200 is illustrated in FIG. 10. The message handler may be represented in its functionality by a plurality of state machines or state automata, that is to say, finite automata, so-called finite state machines (FSM). At least three state machines, e.g., in an example embodiment four finite state machines, are provided. A first finite state machine is the IOBF-FSM and is denoted by 501 (input/output buffer state machine). It would also be possible for that IOBF-FSM to be divided in each transmission direction with regard to the input buffer or the output buffer into two finite state machines IBF-FSM (input buffer FSM) and OBF-FSM (output buffer FSM), whereby a maximum of five state automata (IBF-FSM, OBF-FSM, TBF1-FSM, TBF2-FSM, AFSM) would be possible. However, a common IOBF-FSM may be provided. An at least second finite state machine has been divided here as part of the exemplary embodiment into two blocks 502 and 503 and handles the two channels A and B in respect of buffers 205 and 206, as described in connection with FIG. 2. It is possible for one finite state machine to be provided for handling both channels A and B or, alternatively, as in the preferred form, for one finite state machine TBF1-FSM denoted by 502 (transient buffer 1 (206, RAM A) state machine) to be provided for channel A and, for channel B, a TBF2-FSM denoted by 503 (transient buffer 2 (205, RAM B) state machine).

For controlling access by the three finite state machines 501-503 there is used in the exemplary embodiment an arbiter finite state machine, the so-called AFSM, which is denoted by 500. The data (KD and/or D) are transmitted with a timing generated by or adapted from a clocking means, such as, for example, a VCO (voltage controlled oscillator), an oscillating crystal etc. The timing T may be generated in the module or may be specified from the outside, for example as bus timing. That arbiter finite state machine AFSM 500 gives one of the three finite state machines 501-503 access to the message memory in rotation, especially for one clock period T each. That is to say, the time available is distributed among the individual state automata 501, 502, 503 requesting access according to their access requests. If an access request is made by only one finite state machine, it receives 100% of the access time, or all cycles T. If an access request is made by two finite state machines, each finite state machine receives 50% of the access time. Finally, if an access request is made by three state automata, each of the finite state machines receives ⅓ of the access time. In that manner, optimum use is made of the particular bandwidth available.

The first finite state machine, denoted by 501, that is, IOBF-FSM, performs, when necessary, the following activities:

data transfer from input buffer 201 to the selected message object in message memory 300, data transfer from the selected message object in message memory 300 to output buffer 202.

The finite state machine for channel A 502, that is, TBF1-FSM, performs the following activities:

data transfer from the selected message object in message memory 300 to buffer 206 of channel A, data transfer from buffer 206 to the selected message object in message memory 300, searching for the appropriate message object in the message memory, which involves, in the case of receiving, searching, in the course of acceptance filtering, for the message object (receive buffer) for storage of a message received on channel A and, in the case of transmission, searching for the next message object (transmit buffer) to be sent on channel A.

The activity of TBF2-FSM, that is, the finite state machine for channel B in block 503, is analogous thereto. This finite state machine performs the data transfer from the selected message object in message memory 300 to buffer 205 of channel B and the data transfer from buffer 205 to the selected message object in message memory 300. The search function also is analogous to TBF1-FSM, searching for an appropriate message object in the message memory, which involves, in the case of receiving, searching, in the course of acceptance filtering, for the message object (receive buffer) for storage of a message received on channel B and, in the case of transmission, searching for the next message or message object (transmit buffer) to be sent on channel B.

In FIG. 11, the process flows and the transmission paths are shown once more. The three state machines 501-503 control the respective data transmissions between the individual components. 102 again represents the host CPU, 201 the input buffer and 202 the output buffer. 300 represents the message memory, and the two buffers for channel A and channel B are denoted by 206 and 205. Interface elements 207 and 208 are also shown. The first state automaton IOBF-FSM, denoted by 501, controls the data transfer Z1A and Z1B, that is to say, from input buffer 201 to message memory 300 and from message memory 300 to output buffer 202. The data transmission is performed in this case via data buses having a word length of, for example, 32 bits, but any other bit number is possible. The same applies to the transmission Z2 between the message memory and buffer 206. That data transmission is controlled by TBF1-FSM, or 502, the state machine for channel A. The transmission Z3 between message memory 300 and buffer 205 is controlled by state automaton TBF2-FSM, or 503. In this case also, data transfer takes place via data buses having a word length of, for example, 32 bits, but with any other bit number being possible in this case also. The transfer of a complete message object via the transmission paths mentioned normally requires several clock periods T. Apportionment of the transmission time based on the clock periods T is therefore carried out by the arbiter, that is, by AFSM 500. In FIG. 11, therefore, the data paths between the memory components monitored by the message handler are shown. To ensure the data integrity of the message objects stored in the message memory, advantageously data should be exchanged simultaneously only on one of the data paths shown, that is, Z1A and Z1B, and Z2 and Z3, at the same time.

Figure 12:
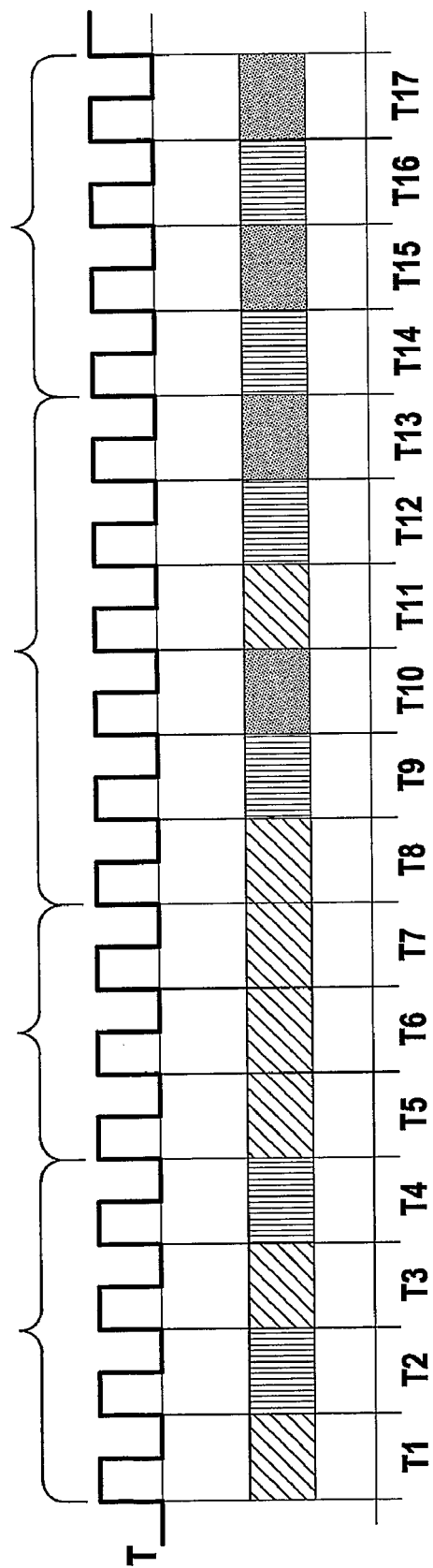
FIG. 12 describes the allocation of access related to the data paths shown in FIG. 11.

FIG. 12 uses an example to show how the available system cycles T are apportioned by the arbiter, that is, by AFSM 500, to the three requesting state automata. In Phase 1, access requests are made by state automaton 501 and state automaton 502, that is to say, half of the total time is apportioned to each of the two requesting state automata. Related to the clock periods in Phase 1, this means that state automaton 501 is given access in clock periods T1 and T3 and state automaton 502 in clock periods T2 and T4. In Phase 2, access is made only by state machine 501, and therefore all three clock periods, or 100% of the access time from T5 to T7, are allotted to IOBF-FSM. In Phase 3, access requests are made by all three state automata 501 to 503, and therefore the total access time is divided into thirds. Arbiter AFSM then distributes the access time in such a way that, for example, in clock periods T8 and T11 finite state machine 501 is given access, in clock periods T9 and T12 finite state machine 502 is given access and in clock periods T10 and T13 finite state machine 503 is given access. Finally, in Phase 4, access is made by two state automata, 502 and 503, to the two channels A and B of the communications module, and therefore access distribution of the clock periods T14 and T16 to finite state machine 502 takes place and, in T15 and T17, to finite state machine 503.

Arbiter state automaton AFSM 500 provides, therefore, that, in the case where more than one of the three state machines requests access to message memory 300, access is apportioned to the requesting state machines alternately, or as the case may be in rotation, and by clock period. This procedure ensures the integrity of the message objects stored in the message memory, that is to say, the data integrity. If, for example, host CPU 102 wants to read out a message object via output buffer 202 while a received message is being written to that message object, depending on which request was started first either the old status or the new status will be read out without the accesses colliding in the message object in the message memory itself.

The described method enables the host CPU to read from or write to any desired message object in the message memory during ongoing operation, without the selected message object being barred from participating in the data exchange on the two channels of the FlexRay bus for the duration of the access by the host CPU (buffer locking). At the same time, by interleaving the accesses by clock period the integrity of the data stored in the message memory is ensured and the transfer rate, also by virtue of the full bandwidth being utilized, is increased.

What is claimed is:

1. A message memory in a communications module for storing a plurality of messages, wherein each message to be stored contains first data having a first data volume and second data having a second data volume, and wherein the second data volume is variable for each message, comprising:
   a header segment in which the first data of each message is stored in a respective header area per message; and
   a data segment in which the second data of each message is stored in a respective data area per message;
   wherein the message memory is configured such that a division between the header segment and the data segment is variable, depending on the number of messages to be stored and the second data volume.

2. The message memory as recited in claim 1, further comprising:
   a data pointer which is provided per message in the header segment in each header area, wherein the data pointer specifies a data area in the data segment.

3. The message memory as recited in claim 1, wherein the first data and the second data of the messages are stored in a predefined order, and wherein the order of the header areas in the header segment and the order of the data areas in the data segment are identical.

4. The message memory as recited in claim 1, wherein the message memory is in the form of a first-in-first-out memory.

5. The message memory as recited in claim 1, wherein the first data of each message is stored in a respective header area using a first number of memory words that is predefined identically for each header area.

6. The message memory as recited in claim 1, wherein the message memory is configured with a predefined, fixed memory word length.

7. The message memory as recited in claim 1, wherein the header area and the data area directly follow each other.

8. The message memory as recited in claim 1, wherein the message memory is operatively linked to a parity bit generator element and a parity bit checking element.

9. The message memory as recited in claim 1, wherein each data area includes at least one predefined memory word length, and wherein for each memory word length, a control identifier in the data area is provided, the control identifier including a parity bit.

10. The message memory as recited in claim 1, wherein the message memory is configured as a component of a communications module.

11. The message memory as recited in claim 1, wherein the message memory is configured as a component of a communications module in a control unit.

12. A method for storing a plurality of messages in a message memory in a communications module, wherein each message to be stored contains first data having a first data volume and second data having a second data volume, and wherein the second data volume is variable for each message, the method comprising:

providing a header segment in which the first data of each message is stored in a respective header area per message;

providing a data segment in which the second data of each message is stored in a respective data area per message; and providing a division between the header segment and the data segment in a variable manner, depending on the number of messages to be stored and the second data volume.

* * * * *